United States Patent [19]
Konishi et al.
[11] 4,041,923
[45] Aug. 16, 1977

[54] INTERNAL COMBUSTION ENGINE OF LEAN AIR-FUEL MIXTURE COMBUSTION TYPE

[75] Inventors: Masami Konishi, Toyota; Eishi Oono, Susono, both of Japan

[73] Assignee: Toyota Jidosha Kogyo Kabushiki Kaisha, Toyota, Japan

[21] Appl. No.: 700,498

[22] Filed: June 28, 1976

[30] Foreign Application Priority Data

May 14, 1976 Japan ................................ 51-054250

[51] Int. Cl.[2] .......................... F02B 23/00; F02B 3/00

[52] U.S. Cl. .............................. 123/191 S; 123/30 C; 123/32 SP; 123/193 R

[58] Field of Search ................ 123/30 R, 30 C, 30 D, 123/32 R, 32 C, 32 D, 32 K, 32 SP, 33 D, 191 R, 191 M, 191 S, 191 SP, 193 R, 193 CH, 193 CP, 193 H, 193 P

[56] References Cited

U.S. PATENT DOCUMENTS

| | | | |
|---|---|---|---|
| 1,501,855 | 7/1924 | Laguesse | 123/191 R |
| 1,816,432 | 7/1931 | Hill | 123/191 M |
| 2,111,282 | 3/1938 | Edwards | 123/30 C |
| 2,154,975 | 4/1939 | Dufour | 123/191 R |
| 2,580,951 | 1/1952 | Pescara | 123/191 M |
| 2,833,265 | 5/1958 | Hindle | 123/191 M |
| 2,843,103 | 7/1958 | Wyczalek | 123/191 M |
| 3,056,392 | 10/1962 | Daub | 123/30 C |
| 3,776,212 | 12/1973 | Karlowitz | 123/30 D |
| 3,980,057 | 9/1976 | Sanda | 123/32 K |

FOREIGN PATENT DOCUMENTS

| | | | |
|---|---|---|---|
| 877,791 | 9/1961 | United Kingdom | 123/191 R |

*Primary Examiner*—Carroll B. Dority, Jr.
*Assistant Examiner*—William Randolph
*Attorney, Agent, or Firm*—Stevens, Davis, Miller & Mosher

[57] ABSTRACT

An internal combustion engine of lean air-fuel mixture combustion type comprising a subsidiary combustion chamber opening into a main combustion chamber via a connecting passage. A raised portion is formed on the top surface of the piston. The raised portion extends from the peripheral end of the inner surface of the cylinder head to the vicinity of the opening of the subsidiary combustion chamber for creating a squish flow along the inner surface of the cylinder head. The connecting passage is arranged so that a high velocity burning jet injected from the subsidiary combustion chamber meets with the squish flow at an angle of less 90°.

4 Claims, 5 Drawing Figures

20
41
17
19
40
13a
A
13
16
14
c
22
15
12a
b
B
16a
21
21a
18
10
12
11

INTERNAL COMBUSTION ENGINE OF LEAN AIR-FUEL MIXTURE COMBUSTION TYPE

DESCRIPTION OF THE INVENTION

The present invention relates to an internal combustion engine of lean air-fuel mixture combustion type.

An internal combustion engine of lean air-fuel mixture combustion type has been proposed in which a combustion chamber comprises a main combustion chamber and a subsidiary combustion chamber. A connecting passage opening into the main combustion chamber is formed in the subsidiary combustion chamber and the spark gap of a spark plug is located in the connecting passage. A lean air-fuel mixture, introduced into the subsidiary combustion chamber from the main combustion chamber via the connecting passage at the time of the compression stroke, is ignited to rapidly burn in the subsidiary combustion chamber. A high velocity burning jet is injected into the main combustion chamber from the connecting passage, causing turbulent combustion of the lean air-fuel mixture in the main combustion chamber and, thereby, simultaneously reducing the amount of harmful HC, CO and $NO_x$ components in the exhaust gas.

In an internal combustion engine of the above described type, as is shown in FIG. 5, the high velocity burning jet 4 injected into the main combustion chamber 2 from the subsidiary combustion chamber 1 moves straight forward along the axis of the connecting passage 3. As a result, regions R are formed which are located apart from the axis of the connecting passage 3 and which cannot be reached by the high velocity burning jet 4. Consequently, since the high velocity burning jet 4 can not come into violent contact with the lean air-fuel mixture contained in the regions R, turbulent combustion is not caused in the regions R. As a result of this, the burned gas is overheated, thus causing the production of $NO_x$. Furthermore, the incomplete combustion causes the production of HC and CO, and the retardation of the combustion speed causes the reduction of the developed power of the engine. As aforementioned, in a conventional engine, there are drawbacks that the exhaust gas contains a large amount of harmful HC, CO and $NO_x$ components.

An object of the present invention is to provide an internal combustion engine of lean air-fuel mixture combustion type capable of reducing the amount of harmful HC, CO and $NO_x$ components in the exhaust gas by eliminating the regions R.

According to the present invention, there is provided an internal combustion engine of lean air-fuel mixture combustion type, comprising:

- a cylinder block;
- a piston reciprocably movable in the cylinder block and having a top surface;
- a cylinder head fixed onto the cylinder block and having an inner surface;
- a main combustion chamber formed between the top surface of the piston and the inner surface of the cylinder head;
- a subsidiary combustion chamber formed in the cylinder head;
- a connecting passage connecting the main combustion chamber with the subsidiary combustion chamber and opening into the main combustion chamber on the inner surface of the cylinder head for leading a lean air-fuel mixture from the main combustion chamber into the subsidiary combustion chamber and for injecting a high velocity burning jet from the subsidiary combustion chamber into the main combustion chamber;
- a spark plug having a spark gap located in a subsidiary combustion region consisting of the subsidiary combustion chamber and the connecting passage, and;
- a squish flow producing means formed on the top surface of the piston for forming a squish area which extends from the peripheral end of the inner surface of the cylinder head to the vicinity of the opening of the connecting passage along the inner surface of the cylinder head and for creating a squish flow along the inner surface of the cylinder head when the piston reaches the vicinity of the top dead center, said connecting passage being arranged so that the high velocity burning jet injected from the connecting passage meets the squish flow at an angle of less than 90°.

The above-mentioned object of the present invention may be more fully understood from the following descriptions of a preferred embodiment of the invention, together with accompanying drawings.

DESCRIPTION OF A PREFERRED EMBODIMENT

Figure 1:
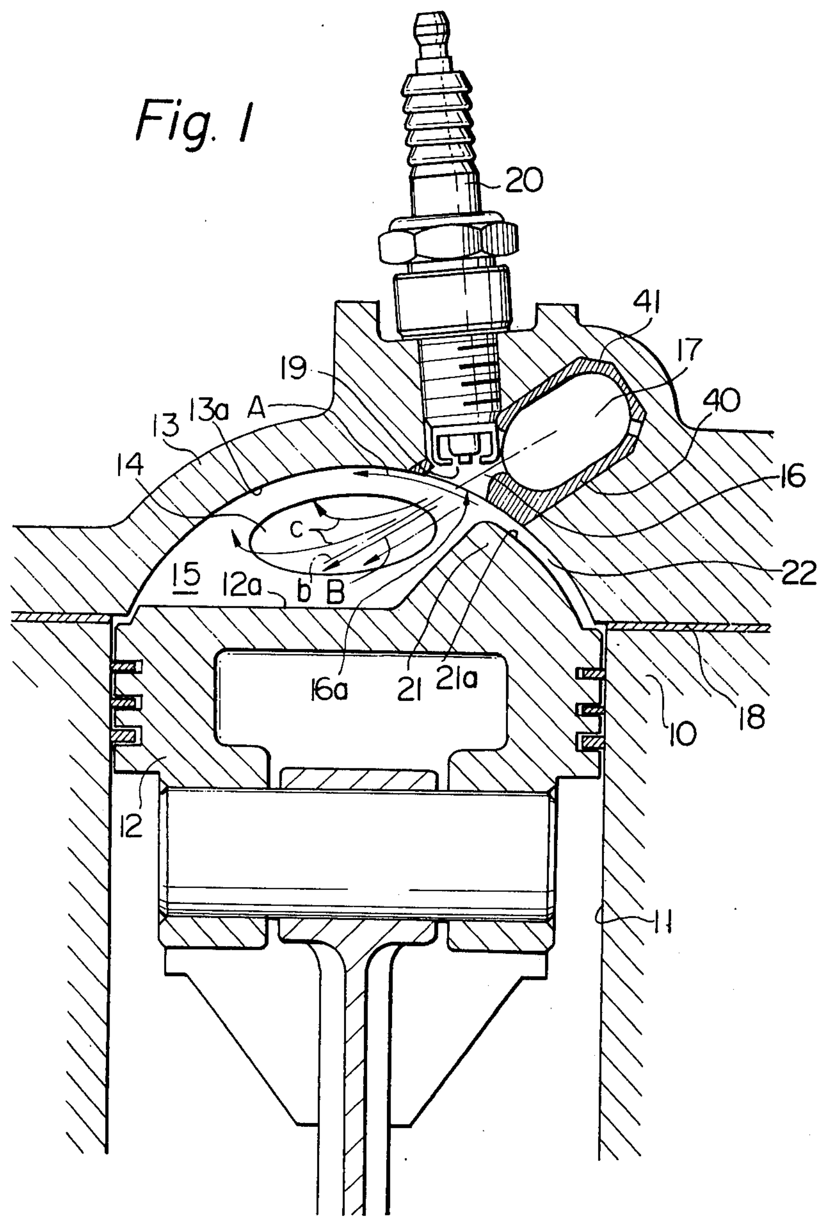
FIG. 1 is a cross-sectional side view of an internal combustion engine according to the present invention.
Figure 2:
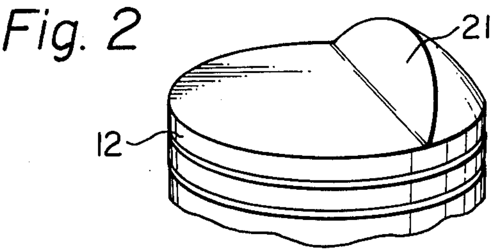
FIG. 2 is a perspective view of a part of a piston shown in FIG. 1.

Referring to FIG. 1, an internal combustion engine of lean air-fuel mixture combustion type comprises a cylinder block 10, a piston 12 reciprocably movable in a cylinder 11 formed in the cylinder block 10, a cylinder head 13 fixed onto the cylinder block 10 via a gasket 18, an intake valve 14, an exhaust valve (not shown), a main combustion chamber 15, a subsidiary combustion chamber 17 provided with a connecting passage 16 opening to the main combustion chamber 15, and a spark plug 20 having a spark gap 19 located in the connecting passage 16. The connecting passage 16 and the subsidiary combustion chamber 17 are formed in the subsidiary chamber component 41. According to the present invention, a raised portion 21 is formed in one piece on the top surface **12*a* of the piston 12 (see FIG. 2). The raised portion 21 is arranged so as to extend from the peripheral end of the top surface 12*a* of the piston 12 to a position adjacent to an opening portion 16*a* of the connecting passage 16. As a result, a squish area 22 is formed between the spherical inner wall 13*a* of the cylinder head 13 and the spherical outer wall 21*a* of the raised portion 21 when the piston 12 reaches the top dead center. The connecting passage 16** is arranged so that the axis *b* of the connecting passage 16 extends substantially towards the central portion of the top surface **12*a* of the piston 12 as shown in FIG.1**.

During the intake stroke, a lean air-fuel mixture is introduced into the main combustion chamber 15 via the intake valve 14. Then, at the time of the compression stroke, the lean air-fuel mixture in the main combustion chamber 15 is pushed into the subsidiary combustion chamber 17 as the piston 12 moves upwards. In accordance with the upward movement of the piston 12, the volume of the squish area 22 becomes smaller, whereby the lean air-fuel mixture in the squish area 22 is pushed out in the direction of arrow A when the piston 12 approaches the top dead center. This results in creating a squish flow which flows along the inner surface 13*a* of the cylinder head 13. Consequently, the lean air-fuel mixture in the main combustion chamber 15 is agitated due to the squish flow.

On the other hand, the lean air-fuel mixture introduced into the subsidiary combustion chamber 17 is ignited by the spark plug 20 when the piston 12 reaches the vicinity of the top dead center. This causes an abrupt combustion of the lean air-fuel mixture in the subsidiary combustion chamber 17, whereby a high velocity burning jet is injected from the connecting passage 16 towards the main combustion chamber 15 as indicated by arrow B. The high velocity burning jet meets the aforementioned squish flow whereby a part of the high velocity burning jet is deflected as indicated by arrow C. As a result of this, the high velocity burning jet is widely spread over the entire space of the main combustion chamber 15, thus causing turbulent combustion of the entire lean air-fuel mixture in the main combustion chamber 15. Furthermore, the squish flow flowing along the inner surface 13*a* of the cylinder head 13 impinges against the periphery of the top surface 12*a* of the piston 12 and, then, is reflected towards the high velocity burning jet, thus increasing the speed of combustion of the lean air-fuel mixture in the main combustion chamber 15.

Figure 4:
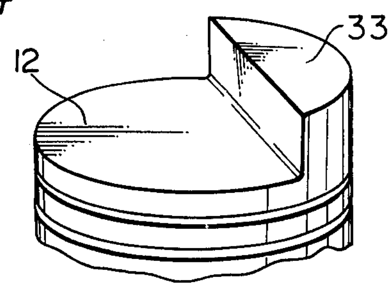
FIG. 4 is a perspective view of a part of a piston shown in FIG. 3.
Figure 5:
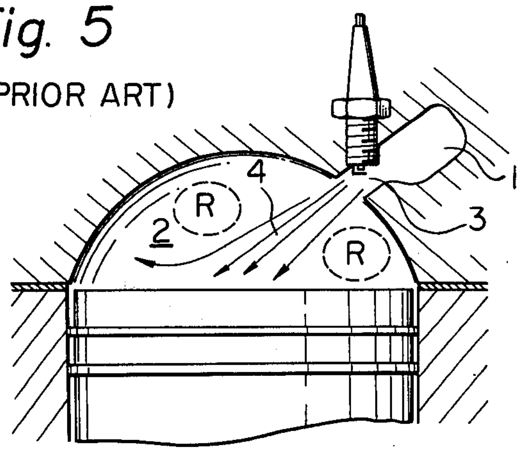
FIG. 5 is a schematic view of a conventional internal combustion engine.
Figure 3:
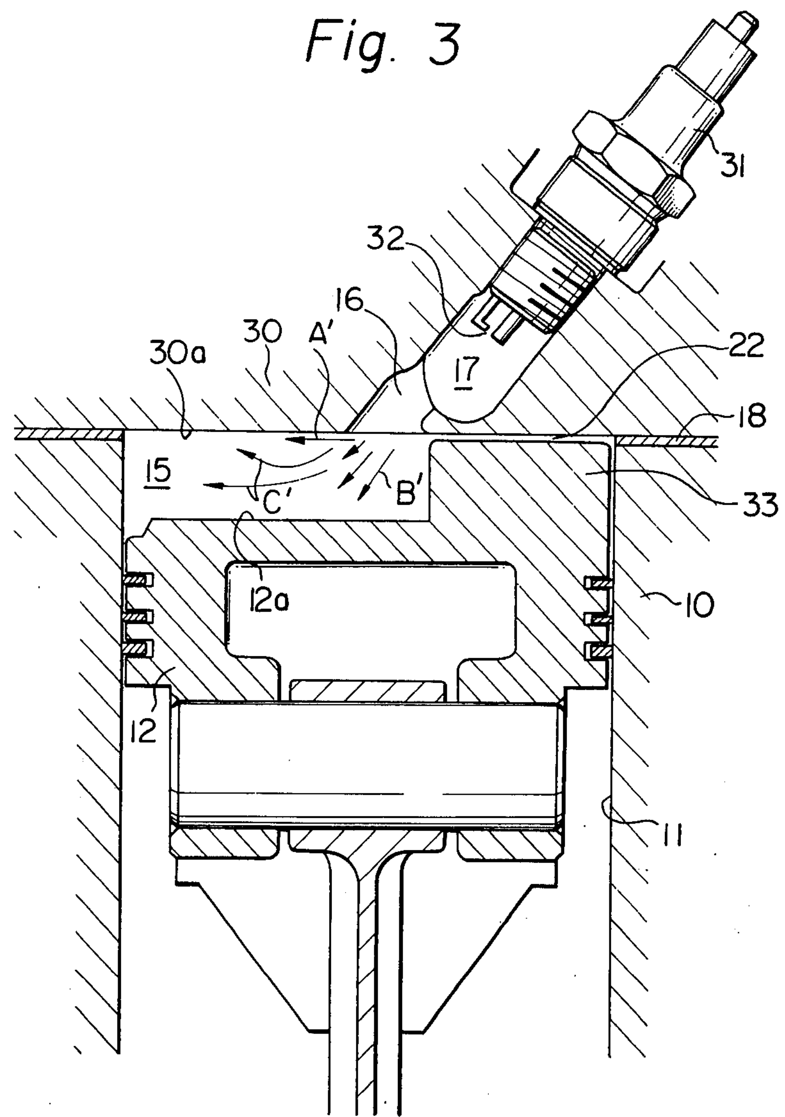
FIG. 3 is a cross-sectional side view of an alternative embodiment.

FIG. 3 shows an alternative embodiment. In FIG. 3, similar components are indicated with the same reference numerals as used in FIG. 1. Referring to FIG. 3, the inner wall 30*a* of the cylinder head 30 is flat, and the spark gap 32 of the spark plug 31 is located at the end of the subsidiary combustion chamber 17 remote from the main combustion chamber 15. In this embodiment, a raised portion 33 having a flat outer surface shown in FIG. 4 is formed in one piece on the top surface 12*a* of the piston 12. The connecting passage 16 is arranged so that its axis extends substantially towards the central portion of the top surface 12*a* of the piston 12. As is shown in FIG. 3, a part of the high velocity burning jet B′ is deflected in the direction of arrow C′ by the squish flow which flows in the direction of arrow A′. As a result of this, the high velocity burning jet is widely spread over the entire space of the main combustion chamber 15, thus causing turbulent combustion of the entire lean air-fuel mixture in the main combustion chamber 15.

As is shown in FIGS. 1 and 3, it is preferably that the connecting passage 16 be arranged so that the angle between the axis of the connecting passage 16 and the axis of the piston 12 is an acute angle. Furthermore, in order to effectively spread the high velocity burning jet over the entire space of the main combustion chamber 15, it is preferable that the connecting passage 16 be arranged so that the high velocity burning jet injected from the connecting passage 16 meets the squish flow at an acute angle. However, the connecting passage 16 may be arranged so that its axis is perpendicular to the inner surface 13*a* of FIG. 1 or 30*a* of FIG. 3 of the cylinder head at a position wherein the connecting passage 16 opens to the main combustion chamber 15, whereby the high velocity burning injected from the connecting passage 16 meets the squish flow at a right angle.

According to the present invention, one of the regions R located apart from the axis of the connecting passage can be eliminated by the raised portion formed on the piston, and the other region R can also be completely eliminated since the high velocity burning jet injected from the connecting passage is widely spread over the entire space of the main combustion chamber due to the squish flow created by the raised portion. Furthermore, the high velocity burning jet is effectively strengthened due to the fact that the squish flow meets the high velocity burning jet at the outlet of the connecting passage. In addition, the main combustion chamber becomes compact due to the raised portion on the piston. This results in causing turbulent combustion of the lean air-fuel mixture in the main combustion chamber, thus reducing the amount of harmful HC and CO components produced due to incomplete combustion. Still further, the maximum temperature of the combustion can be reduced, thus reducing the amount of harmful $NO_x$ components produced. In addition, the speed of combustion increases, thus increasing the developed power of the engine. Also, since the developed power is increased, it is possible to retard the ignition timing. Consequently, the amount of harmful $NO_x$ components produced can be further reduced.

What is claimed is:

1. An internal combustion engine of lean air-fuel mixture combustion type, comprising:

a cylinder block;

a piston reciprocably movable in the cylinder block and having a top surface;

a cylinder head fixed onto the cylinder block and having an inner surface;

a main combustion chamber formed between the top surface of the piston and the inner surface of the cylinder head;

a subsidiary combustion chamber formed in the cylinder head;

a connecting passage connecting the main combustion chamber with the subsidiary combustion chamber and opening into the main combustion chamber on the inner surface of the cylinder head for leading a lean air-fuel mixture from the main combustion chamber into the subsidiary combustion chamber and for injecting a high velocity burning jet from the subsidiary combustion chamber into the main combustion chamber;

a spark plug having a spark gap located in a subsidiary combustion region consisting of the subsidiary combustion chamber and the connecting passage, and;

a squish flow producing means including a raised portion formed on one side of the top surface of the piston for forming a squish area which extends from the peripheral end of the inner surface of the cylinder head to the vicinity of the opening of the connecting passage along the inner surface of the cylinder head and for creating a squish flow along the inner surface of the cylinder head when the piston reaches the vicinity of the top dead center, said connecting passage being directed away from the squish area and arranged so that the high velocity burning jet injected from the connecting passage meets with the squish flow at an angle of less than 90°.

2. An internal combustion engine as recited in claim 1, wherein said raised portion is formed in one piece.

3. An internal combustion engine as recited in claim 2, wherein the cylinder head has a spherical inner surface, the raised portion has a spherical outer surface, the squish area being formed between said spherical inner surface and said spherical outer surface, and the spark gap of the spark plug is located in the connecting passage.

4. An internal combustion engine as recited in claim 2, wherein the cylinder head has a flat inner surface and the raised portion has a flat outer surface, the squish area being formed between said flat inner surface and said flat outer surface.

* * * * *